United States Patent
Louden et al.

(10) Patent No.: US 11,946,331 B2
(45) Date of Patent: Apr. 2, 2024

(54) DOWNHOLE METHOD AND APPARATUS

(71) Applicant: ISOL8 (HOLDINGS) LIMITED, Aberdeen (GB)

(72) Inventors: Andrew Louden, Old Aberdeen (GB); William Edward Lowry, Port Townsend, WA (US)

(73) Assignee: ISOL8 (HOLDINGS) LIMITED, Aberdeen (GB)

( * ) Notice: Subject to any disclaimer, the term of this patent is extended or adjusted under 35 U.S.C. 154(b) by 256 days.

(21) Appl. No.: 17/421,665

(22) PCT Filed: Jan. 10, 2020

(86) PCT No.: PCT/EP2020/025006
§ 371 (c)(1),
(2) Date: Jul. 8, 2021

(87) PCT Pub. No.: WO2020/144091
PCT Pub. Date: Jul. 16, 2020

(65) Prior Publication Data
US 2022/0090463 A1 Mar. 24, 2022

(30) Foreign Application Priority Data
Jan. 10, 2019 (GB) .................................. 1900369

(51) Int. Cl.
*E21B 33/12* (2006.01)
*E21B 33/134* (2006.01)
(Continued)

(52) U.S. Cl.
CPC .......... *E21B 33/1204* (2013.01); *E21B 33/12* (2013.01); *E21B 33/1212* (2013.01);
(Continued)

(58) Field of Classification Search
CPC ............ E21B 33/1204; E21B 33/1208; E21B 33/1212; E21B 33/134
See application file for complete search history.

(56) References Cited

U.S. PATENT DOCUMENTS 3,208,530 A 9/1965 Allen et al.
7,640,945 B2 1/2010 Lin
(Continued)

FOREIGN PATENT DOCUMENTS

| EP | 3241982 B1 | 12/2019 |
| GB | 2430685 A | 4/2007 |
| WO | 20180152 A1 | 4/2018 |

OTHER PUBLICATIONS

International Search Report and Written Opinion for Int. App. No. PCT/EP2020/025006 dated Aug. 3, 2020.

*Primary Examiner* — Kristyn A Hall
(74) *Attorney, Agent, or Firm* — MCDONNELL BOEHNEN HULBERT & BERGHOFF LLP

(57) ABSTRACT

A method of sealing a subsurface bore comprises: locating a volume of thermite in the bore; locating a volume of alloy in the bore with the thermite; initiating reaction of the thermite to heat the alloy; and bringing the alloy to above the melting point of the alloy whereby the alloy flows and occludes the bore. The thermite may retain its initial form during or following reaction or may partially fluidise. The thermite may react to provide a platform that at least partially occludes the bore. The alloy may flow over a surface of the thermite.

26 Claims, 6 Drawing Sheets

(51) Int. Cl.
 *E21B 36/00* (2006.01)
 *C09K 8/42* (2006.01)
(52) U.S. Cl.
 CPC ............ *E21B 33/134* (2013.01); *E21B 36/00* (2013.01); *C09K 8/426* (2013.01)

(56) References Cited

U.S. PATENT DOCUMENTS

| | | |
|---|---|---|
| 9,494,011 B1 | 11/2016 | Lowry et al. |
| 2006/0037748 A1 | 2/2006 | Wardlaw et al. |
| 2006/0144591 A1* | 7/2006 | Gonzalez ................ E21B 29/10 166/57 |
| 2015/0211322 A1 | 7/2015 | Lowry et al. |
| 2018/0094504 A1 | 4/2018 | Hearn et al. |
| 2019/0003282 A1 | 1/2019 | Doherty |

* cited by examiner

DOWNHOLE METHOD AND APPARATUS

CROSS REFERENCE TO RELATED APPLICATIONS

The present application is a U.S. National Phase Application pursuant to 35 U.S.C. § 371 of International Application No. PCT/EP2020/025006 filed Jan. 10, 2020, which claims priority to UK Patent Application No. 1900369.8 filed Jan. 10, 2019. The entire disclosure contents of these applications are herewith incorporated by reference into the present application.

FIELD

This disclosure relates to a downhole method and apparatus. Examples of the disclosure relate to methods and apparatus for use in sealing well bores and may have utility in permanently sealing oil and gas wells that are being abandoned.

BACKGROUND

In the oil and gas exploration and production industry, bores are drilled from surface to access subsurface hydrocarbon-bearing formations. The bores, or wells, are typically lined with multiple lengths of coaxial steel tubing, often referred to as casings. An annulus of set cement fills and seals the gap between the outermost casing and the surrounding rock formation. The gaps between the other casings may be filled with cement, well debris, or well fluid/water.

When a well is being abandoned it is necessary to seal the well to ensure there is no subsequent release of gas or oil from the well or movement of fluid between different formations. Conventionally, this is achieved by cutting and retrieving at least some of the tubing/casing or in some circumstances by milling out a section of casing. The resulting casing-free section of the well bore is then filled and sealed with a plug of cement, which may be several hundred feet long. This process is time-consuming and expensive, and there are concerns that cement plugs may degrade, crack and shrink over time.

Other proposals for sealing wells involve use of plugs of other materials or combinations of materials, such as resins, low melt point alloys and thermite.

SUMMARY

According to an example of the present disclosure there is provided a method of sealing a subsurface bore, the method comprising:
  locating a volume of thermite in the bore;
  locating a volume of alloy in the bore;
  initiating reaction of the volume of thermite to heat the volume of alloy; and
  bringing the volume of alloy to above the melting point of the alloy whereby the alloy flows and thermite reaction products and the alloy combine to provide a bore-sealing plug.

As they cool in the bore, the thermite reaction products and the alloy solidify or freeze and together form a bore-sealing plug. The thermite may provide mechanical strength and support and the alloy may assure provision of an effective seal. The alloy may at least partially cover a surface of the thermite and may extend radially beyond the thermite. The alloy may fuse and comingle with the thermite and may extend into any pores, cracks or fissures in the surface of the thermite. The plug may consist substantially of thermite reaction products and alloy or may comprise other materials or structures.

Other aspects of the disclosure relate to apparatus for use in or in relation to the method. For example, a downhole apparatus comprising:
  a volume of thermite;
  a volume of alloy associated with the volume of thermite; and
  a thermite reaction initiator,
  whereby initiating reaction of the volume of thermite heats the alloy to above the melting point of the alloy whereby the alloy flows and combines with thermite reaction products to form a bore-sealing plug.

These and other aspects of the disclosure may have utility in well plugging for abandonment, and to isolate a hydrocarbon reservoir and any intermediate or shallower formation zones. Aspects of the disclosure may be useful in well intervention at other stages during the life cycle of a well.

The volume of alloy may be run into the bore together with the volume of thermite. Alternatively, the alloy may be run into the bore separately of the thermite, for example after the thermite has been run into the bore.

The thermite may substantially retain its initial form during or following reaction or may at least partially fluidise and become mobile, and thus slump or flow. The mobility of the thermite may be improved by providing an additive in the volume of thermite, whereby the metal and the metallic or non-metallic oxide of the thermite react exothermically to form a metal oxide and the corresponding metal or non-metal of the reactant oxide, and whereby the metal oxide reacts with the additive to form a low solidification temperature reaction product having a solidification temperature lower than the solidification temperature of the pure metal oxide. The low solidification temperature reaction product may flow until the temperature of the reaction product decreases to the liquidus temperature of the product, at which point it no longer flows and becomes a solid, and thus such a modified thermite is likely to be able to remain mobile for longer than the higher solidification temperature metal oxide.

Alternatively, or in addition the fluidity of the thermite may be adjusted by dilution of the reactive thermite components with a high solidification temperature additive, which will tend to provide a "stiffer" thermite which is more likely to retain an initial form and flow very little or not at all. An undiluted thermite mix will react and flow quickly to solidify at a high temperature, whereas a mix diluted with a low solidification temperature additive is more likely to form reaction products which continue to flow at lower temperatures before solidifying.

The thermite may be provided within a container or in combination with a support or enclosure, or the thermite may be self-supporting. If a container or the like is provided the container may melt or otherwise degrade as the thermite reacts.

The thermite may react to provide a platform that at least partially occludes the bore. The alloy may flow over a surface of the thermite reaction products.

The method may further comprise providing a flux compound to enhance bonding between the alloy and bore-lining tubing. The flux may be provided within or in combination with the volume of alloy, or may be provided in a liquid to be circulated into the bore.

The method may include heating one or more of the well bore, well fluid and well bore structures, for example tubing, casings, water, cement, sand and rock formations. The heating may take place in and around a sealing location. At least a degree of the heating may be provided by the thermite, and one or more additional heaters may be provided. The heaters may be activated in sequence, in unison, or in any selected combination. The additional heaters may provide heating before, in combination with or after reaction of the thermite. Increasing the temperature of the well bore in and around the sealing location will typically facilitate extended radial flow of at least one of the thermite reaction products and the alloy, if desired. Any molten material contacting well bore fluid or structures at a lower temperature than the molten material will lose energy and eventually the molten material will cool to an extent that the material experiences a phase change from liquid to solid. At this point the material will cease flowing and may prevent further passage of still mobile material. Thus, increasing the temperature of the well bore in and around the sealing location will typically facilitate extended radial flow of molten material. As noted above this may be achieved by pre-heating the well bore before the molten alloy is introduced into the sealing location, and optionally by continuing to heat the well bore as the molten alloy is flowing.

The volume of alloy may be heated by any appropriate method. The reacting thermite may act as a primary heater for the alloy. The reacting volume of thermite may provide a degree of heating for the alloy, and a further degree of heating may be provided by another heat source, for example a further volume of thermite or an electric heater. The alloy may be arranged to remain in contact with a heat source until the alloy exits an alloy reservoir, which may be achieved by providing a bailer arranged to bail molten alloy from a lower portion of the reservoir. The alloy may flow from the reservoir under the influence of gravity, or the alloy may be pushed or purged, for example by a piston or by hydraulic action. The volume of alloy may be heated to a temperature well in excess of the melting temperature of the alloy, for example in excess of the melting temperature by at least 500, 400, 300, 200, 100 or 50° C. The volume of alloy may be contained or restrained until the temperature of the alloy has reached a predetermined, elevated level. For example, the alloy may be contained within a reservoir until the temperature of the alloy reaches a predetermined temperature well in excess of the melting temperature of the alloy. For example, the alloy may be contained within an enclosure which melts or degrades at a predetermined elevated temperature. The super-heated alloy is then released and permitted to flow into the surrounding volume. The alloy will experience cooling on contacting well fluids and well structure but will have to cool by a significant degree before freezing, and thus will remain fluid and mobile for an extended period.

If additional thermite heaters are provided these heaters may be provided in any appropriate form. For example, a thermite heating canister may be lowered into the well to the seal location and initiated. This thermite canister may be either consumable, allowing the thermite to react and slump or flow and at least partially fill the well volume, or non-consumable, in which case the thermite remains contained in the canister and, if desired, may be removed after the reaction has occurred and heat has been transferred to the surroundings Multiple such emplacements may be employed to significantly increase the thermal reach of the system.

The thermite may be of any appropriate composition of metal and metallic or non-metallic oxide which will react exothermically to form a more stable oxide and the corresponding metal or non-metal of the reactant oxide. For example, the thermite may comprise a mix of iron oxide and aluminium. If heated to an appropriate initiation temperature, for example 800-1300° C., the iron oxide/aluminium thermite may react exothermally and generate temperatures of up to, for example, 2900° C. The thermite may include additives which lower the peak reaction temperature, if desired, or the solidification temperature of the thermite reaction products, as described herein in relation to one or more of the other aspects. Alternatively, or in addition, the thermite may include an additive which affects the behaviour and properties of the molten thermite reaction products. Diluting the active thermite components with a high melt material tends to provide a stiffer material in which the metallic thermite reaction products remain dispersed through the volume, which solidifies relatively quickly and is more likely to retain an initial, unreacted form. On the other hand, the molten reaction products of an undiluted thermite mix may settle into layers of, for example, molten iron and molten aluminium oxide. The mobility of the reaction products may further be enhanced by diluting the thermite mix with a low solidification temperature material.

Where the thermite reaction products form a platform for the alloy at least a portion of the platform may initially be at a temperature above the melting point of the alloy as the alloy flows over a surface of the platform, thus enhancing the mobility of the molten alloy.

The thermite may substantially retain its original form during and following reaction of the thermite, or the thermite may be at least partially fluidised, and may be permitted to slump or flow.

The thermite may have a form selected to provide a close fit in the bore at the sealing location, to minimise the gap between the thermite and the bore wall. Typically, the thermite will have a cylindrical form. A smaller gap between the thermite and the bore wall may improve heat transfer to the bore wall. A smaller gap will also be more easily filled and closed by the mobilised alloy. If the thermite is configured to retain its original form, the well fluid in the gap will be heated and rise in the bore, transferring heat to the volume of alloy above the thermite. At least partially fluidised thermite may flow or slump to decrease the spacing between the volume of thermite and a bore wall or other downhole structures. The at least partially fluidised thermite may flow or slump such that a surface of the thermite contacts the bore wall or other downhole structures. This may increase the heating effect of the bore wall by the thermite, for example the bore wall may be heated by conduction from the thermite. The flow of well fluid past the thermite will also be prevented or restricted, limiting heat loss to the well fluid. The thermite may be initially contained before being released and permitted to flow or move radially outwards. This may permit a degree of heating of the well surrounding the thermite before the thermite flows outwards and experiences cooling from contact with well bore structures and fluids.

The bore may include one or more lengths of bore-lining tubing. For example, the bore may include a completion, or one or more casings or liners. The bore may include one or more cement sheaths or cement-filled annuli. For example, a cement sheath may be provided between an outer casing and a surrounding formation, or cement may be provided between adjacent casings. Perforations or other openings, such as holes, slots, cuts or tears, may be formed in the bore wall and may extend at least partially through at least one bore-lining tubing and at least one cement sheath. Perforations may extend from the bore to the surrounding formation and may extend into the surrounding formation. The perforations or other openings may be radially and axially spaced. A washing or jetting step may follow the perforation step, which washing step may be utilised to remove damaged or unconsolidated cement, rock or sand, or remove other material or debris. Alternatively, or in addition, bore-lining tubing may be retrieved, cut and removed, milled away, deformed, expanded or otherwise eroded or dissolved, or cuts or tears may be formed in the tubing. Similarly, cement may be removed from between tubing sections or to expose sections of formation.

At least one of the thermite reaction products and the alloy may flow into and through the perforations or other openings. The passage of molten thermite reaction products of molten alloy through the perforations or other openings may be achieved without significantly degrading the perforated material.

At least one of the fluidised thermite reaction products and alloy may flow into any fissures, gaps or voids between bore structures, such as rock fissures, cement cracks and fissures, annuli between bore-lining tubing sections, and gaps and annuli between bore-lining tubing sections and cement sheaths. At least one fluidised thermite product may flow and extend into a volume adjacent the bore, and at least partially fill the volume, before the alloy flows into the volume. In one example, the thermite product flows into the volume and solidifies in the volume to create a contiguous platform around the tubing and thus contains the alloy above the platform. The fluidised thermite product may flow into a lower portion of the volume adjacent the bore and the alloy may flow into an upper portion of the volume. The alloy may also flow into the lower portion of the volume and may flow into fissures, cracks or voids already partially occupied by thermite reaction product and the alloy may fuse or bond with the thermite. The volume may be an annulus, or multiple annuli, and the thermite reaction product may flow into the annulus and solidify therein, preventing subsequent flow of the alloy into a lower portion of the annulus. The reacting thermite and the fluidised thermite product may have heated the volume adjacent the bore, facilitating extended flow of the alloy.

If multiple sections of bore-lining tubing are present, the tubing may be radially deformed or expanded to reduce the radial spacing between the sections, and to reduce the radial spacing between the outermost tubing and the surrounding formation. The reduced spacing may facilitate heat transfer between the sections and may restrict axial movement of molten thermite products or molten metal between the sections. The radial deformation may be achieved using any appropriate method, for example mechanical, hydraulic or explosive expansion. The bore-lining tubing may be heated or otherwise treated to facilitate deformation.

The alloy may be any appropriate material and will typically have a lower melting point than at least one thermite reaction product. The alloy may be a low melt point alloy, for example a Bismuth alloy such as a Bismuth Tin (Bi/Sn) alloy and may be a eutectic alloy. The metal may be a 58/42 Bismuth Tin (Bi/Sn) alloy, which melts/freezes at 138° C.

The alloy may be delivered into the bore in solid form and then melted to allow the liquid alloy to flow over, around and beyond the thermite and fill and seal the bore, before freezing. In other examples the alloy may be subject to heating before being delivered into the bore. The alloy may fuse to the surface of the thermite.

The alloy may be dense and effective in displacing water, other well fluids, sand and loose cement and rock.

The alloy may have at least one of: a lower melting temperature than at least one thermite reaction product, greater mobility than at least one thermite reaction product in its molten phase, and greater density than at least one thermite reaction product. Thus, the molten alloy will tend to flow more readily than the thermite reaction product and may flow further from an initial location than the thermite reaction product.

The alloy may expand whilst transitioning from the molten to the solid phase. The alloy may thus be effective in closing any gaps or spaces which remain between the thermite and the bore wall or other bore structures.

The alloy may be a corrosion resistant alloy. The thermite reaction products may include an iron or other metal component and a ceramic component. The ceramic component and the alloy together facilitate provision of a substantially corrosion-resistant seal in the bore.

The volume of alloy may be initially located above the volume of thermite and may sit directly on an upper surface of the thermite or a thermite-containing capsule or canister to facilitate heating of the alloy by the thermite. The volume of alloy may be fixed or bonded to the thermite. The volume of thermite may be supported such that the mass of alloy tends to compress the thermite.

A support or plug may be positioned in the bore below the volume of thermite and may assist in retaining the thermite and preventing or restricting downwards axial movement of molten thermite products, or of molten alloy. The plug may be a bridge plug or may be a volume of settable material, such as cement or resin. The plug may have been formed by reacting a volume of thermite in the bore, which thermite may have a composition selected to expand radially and engage the bore wall. The plug may be provided as part of the sealing apparatus and may be run into the bore together with the thermite and alloy volumes, or may be run into the bore separately and may be set prior to the thermite and alloy volumes being run into the bore.

Single or multiple sections of bore-lining tubing may be radially deformed/expanded to reduce the radial spacing between the sections to prevent or restrict downwards axial movement of molten thermite products, or of molten metal in single or multiple annuli.

In these and other aspects of the disclosure the hermite may be used as a platform for another material rather than or in addition to the alloy. The other material may take any appropriate form, including cement, expanding cement, a polymer or resin.

According to a further aspect of the present disclosure there is provided a downhole method comprising:
  providing a volume of thermite comprising a metal and a metallic or non-metallic oxide;
  providing an additive in the volume of thermite;
  locating the volume of thermite in a bore;
  initiating reaction of the thermite whereby the metal and the metallic or non-metallic oxide react exothermically to form a metal oxide and the corresponding metal or non-metal of the reactant oxide, and whereby the metal oxide reacts with the additive to form a low solidification temperature reaction product having a solidification temperature lower than the solidification temperature of the metal oxide.

The low solidification temperature reaction product may flow until the temperature of the reaction product decreases to the liquidus temperature of the product at which point it ceases to flow.

Another aspect of the disclosure relates to a thermite composition including an additive which forms a thermite reaction product having a low solidification temperature.

These aspects of the disclosure may be used in combination with the other aspects described herein.

In a stoichiometric thermite reaction, the molar ratio of metal to oxidizer is such that the products are pure metal (such as iron) and oxide (such as aluminium oxide). Pure aluminium oxide has a high melting and solidification temperature (2072° C.). Consequently, the aluminium oxide will tend to solidify rapidly after the reaction occurs, and if permitted to flow or slump may freeze on or soon after contacting tubing, casing, or other wellbore materials. This rapid solidification tends to inhibit the flow of the aluminium oxide, and other reaction products intermixed with the oxide, and may freeze tool components in place unintentionally. As described herein the reaction can be modified with selected additives to alter the properties of the ceramic aluminium oxide product component in order to achieve specific thermal and physical properties. For example, to lower the solidification temperature of the ceramic product an additive may be provided to combine with the aluminium oxide to reduce the solidification temperature. For example, silicon dioxide will combine with the aluminium oxide to form aluminosilicate, reducing the solidification temperature from 2072° C. to 1840° C. Alternatively, or in addition, a further reduction in solidification temperature may be obtained by providing an additive which converts the aluminium oxide product to a mineral, such as feldspar, having a lower solidification temperature. Conversion of the aluminium oxide to feldspar may be achieved by adding a molar mixture of calcium inosilicate (wollastonite) and silicon dioxide to the thermite reactants. At its stoichiometric formulation (approximately 44% of the total reactant mass) a pure anorthite feldspar will be produced, with a solidification temperature of approximately 1500° C. Wollastonite and silicon dioxide additive ratios of 5% to 44% by mass will thus reduce the solidification temperature to facilitate flow of the ceramic product components into annuli and other voids to, for example, form platforms for low melt temperature alloy seal materials. If desired, these mixtures can be diluted to provide the desired flow characteristics best suited for specific downhole conditions, for example downhole temperatures, annulus dimensions, and number of annuli.

Other forms of mineral additives can be utilised to achieve similar effects. Also, if an alternative thermite composition is utilised, additives may be selected which will react with the oxide reaction product to form minerals or other compounds having a lower solidification temperature than the oxide reaction product.

If considered desirable, the thermite may include an additive effective to lower the peak reaction temperature of the thermite. For example, the peak reaction temperature of the thermite may be reduced to less than 2900° C. Controlling the peak reaction temperature of the thermite may provide an operator with various advantages. The peak reaction temperature of thermite is typical approximately 2900° C. and this may be a higher temperature than is required by the operator and may have undesirable consequences or effects. For example, higher temperatures may degrade or damage well structures or may induce or trigger undesirable phase changes or reactions.

The modified peak reaction temperature may be less than 2800° C., 2700° C., 2600° C., 2500° C., 2400° C., 2300° C., 2200° C., 2100° C. or 2000° C.

According to another aspect of the present disclosure there provided a downhole method comprising:
displacing well fluid from a selected portion of a well bore with a material having a lower heat capacity than water; and
activating a heater in the selected portion of the well bore.

When heating a selected portion of a well bore, for example to mobilise a low melt alloy to form a plug or seal, a large proportion of the energy from a downhole heater, and the energy of the heated alloy, will tend to be absorbed by surrounding well fluid, which is typically water or brine. The mobility of the well fluid may also increase the heat loss from the portion of the well bore as heated well fluid is replaced by cooler well fluid. At higher temperatures, the phase change of water from liquid to gas also absorbs energy and the large and possibly sudden and uncontrolled increase in volume may also have a disruptive effect. These affects may be reduced by displacing at least some of the water with a material having a lower heat capacity.

The material may have flux-like properties to facilitate formation of a bond between a mobilised low melt alloy and well bore structures, such a bore-lining tubing, particularly steel tubing, cement, sand or rock. Alternatively, a separate or additional flux material may be provided, such as organic acid flux compounds commonly used in solder or low melt temperature alloy joining processes. These fluxes serve to deoxidize the surfaces and enhance the wettability of the metals being joined. The flux may be delivered into the well bore with the heater or separately of the heater.

The material may be selected to absorb less energy than water as the material is heated, allowing the material, and adjacent well bore structures, to be heated to higher temperatures than would have been the case if water was present.

The material may be selected to undergo a phase change from liquid to gas at a higher temperature than water, and to absorb less energy when undergoing the phase change than water.

The material may displace some or all the well fluid from the selected portion of the well bore.

The material may be deployed in liquid or flowable form or may be provided in solid or semi-solid form and melted in the well bore. The material may be delivered into the well bore together with the heater or may be delivered separately of the heater.

The material may be heated before being delivered into the well bore or may be heated in the well bore. The heated material may transfer heat to the well bore and may absorb less heat during subsequent heating of the well bore.

The material may comprise glycerol, having a specific gravity (SG) of 1.26 and a boiling point (BP) of 290° C., or propylene glycol (SG=1.036, BP=188° C.).

The material may comprise cross-linked polymers, or non-linked polymers, to provide the specific density or viscosity characteristic desired.

The material may comprise bentonite, and an operator may displace water or brine with bentonite mud. The bentonite dilutes or reduces the specific heat and the increased viscosity reduces thermal convection.

The heater may take any appropriate form and may be a chemical reaction heater, such as a thermite heater, or may be an electric heater.

According to another aspect of the present disclosure there is provided a downhole bonding method comprising supplying flux to a downhole bonding location.

The skilled person will appreciate that the different aspects of the disclosure described herein may be combined or may be provided individually, and the various features of the different aspects described above, and as recited in the attached claims, may be combined with other aspects and may have individual utility, separately of the various aspects of the disclosure.

BRIEF DESCRIPTION OF THE DRAWINGS

These, and other aspects of the disclosure will now be described, by way of example, with reference to the accompanying drawings, in which.

DETAILED DESCRIPTION

Figure 1:
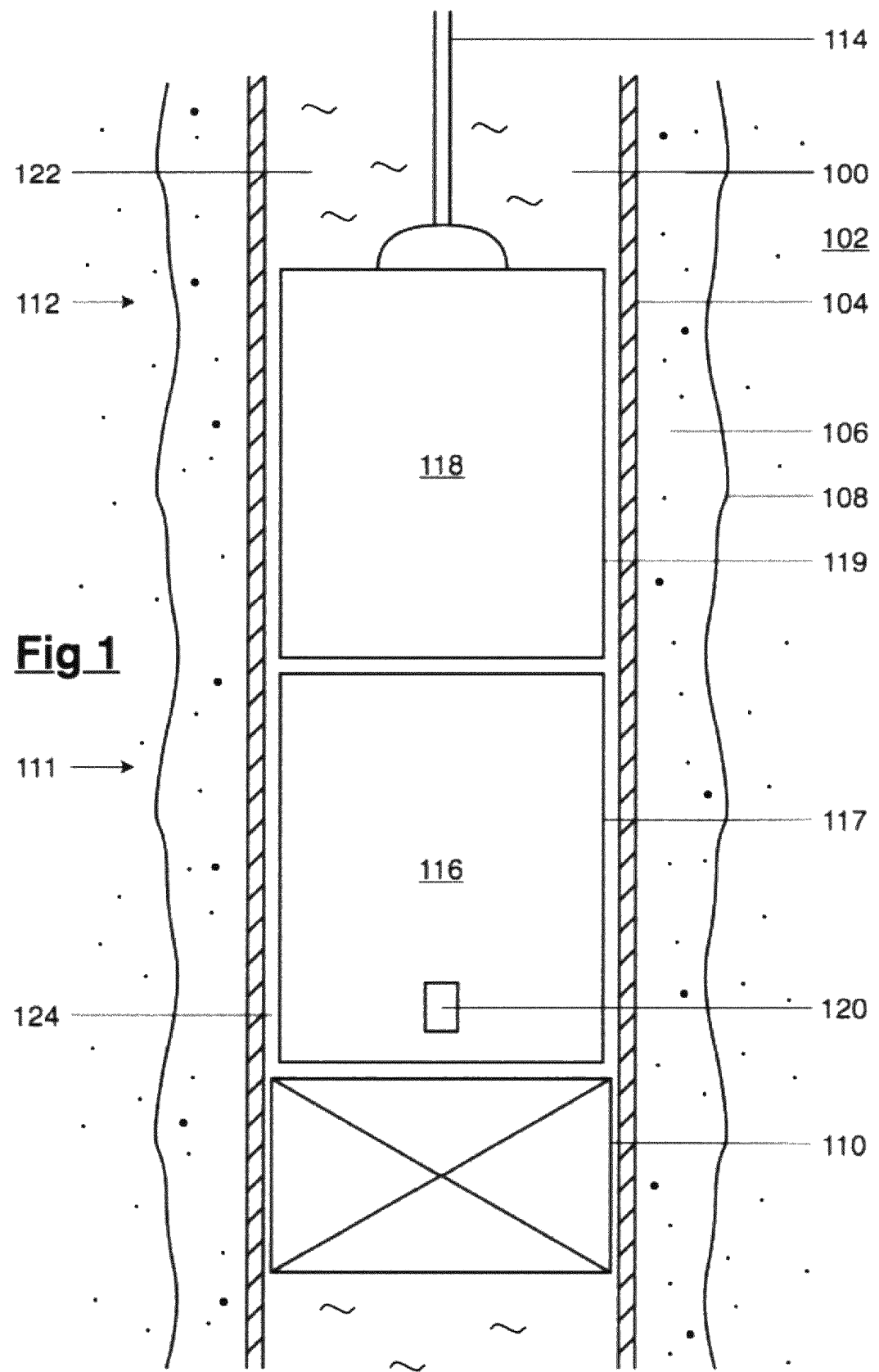
FIGS. 1 and 2 are sectional views of a well bore and show steps in a bore-sealing method according to a first example of the present disclosure.

Reference is first made to FIG. 1 of the drawings which illustrates a section of a well bore 100 which has been created to access a subsurface hydrocarbon-bearing formation (not shown) from surface. The well bore 100 extends through a rock formation 102 and includes a metal bore-lining casing 104. An annulus 106 between the casing 104 and the rock formation 102 is sealed with a cement sheath 108.

Figure 2:
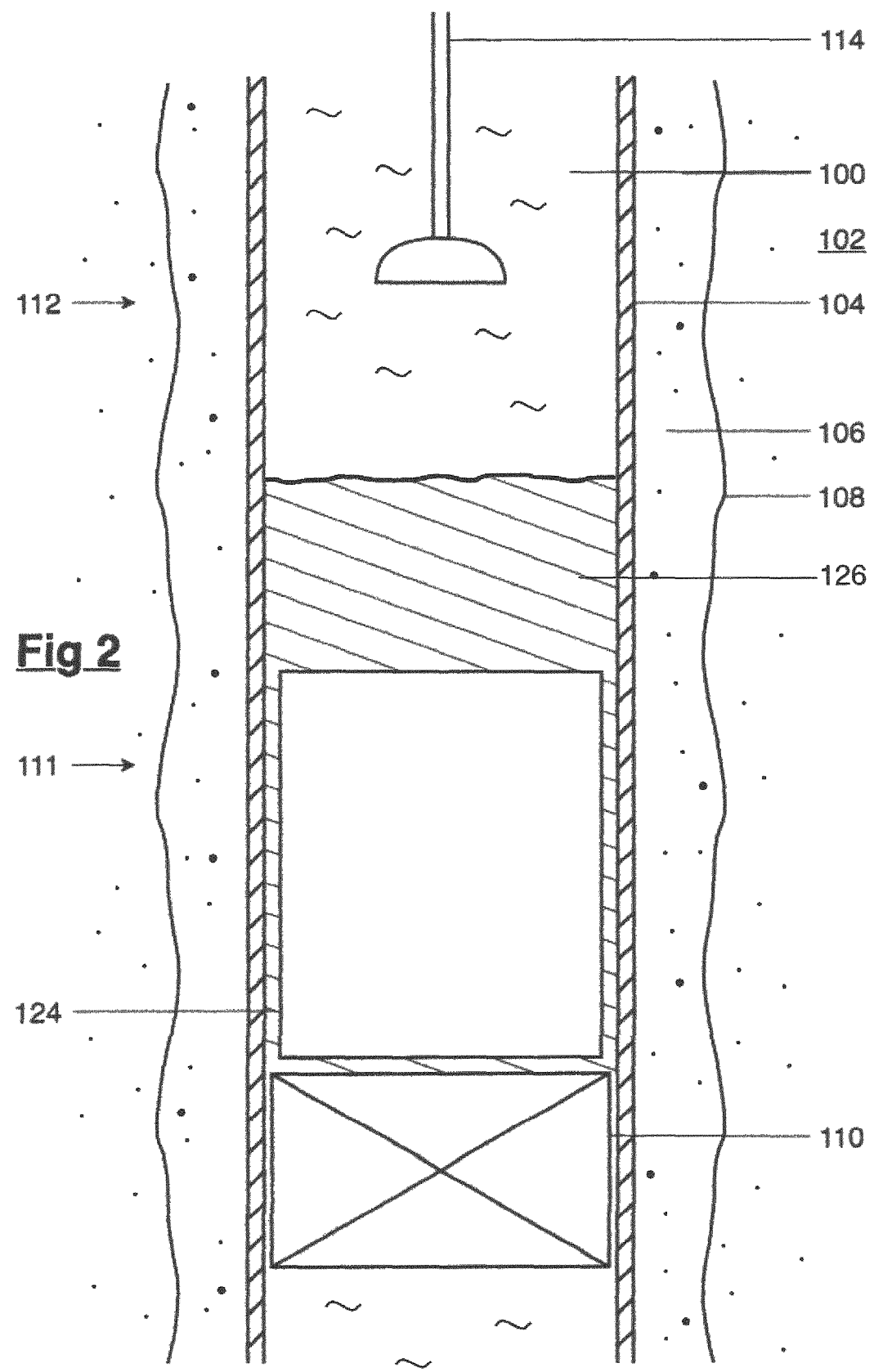

The operator has decided to permanently seal the well bore 100 and the sealing operation will be described with reference to FIGS. 1 and 2. A permanent bridge plug or anchored platform 110 has previously been set in the bore 100 at the lower end of the intended sealing location 111. Sealing apparatus 112 in accordance with a first example of the present disclosure is then run into the bore 100 on a reelable support, such as coil tubing or wireline 114. The apparatus 112 comprises a volume of thermite 116, in this example an aluminium and iron oxide mix, and a volume of a barrier sealing material such as a low melt-point alloy 118, in this example a 58/42 Bismuth Tin (Bi/Sn) alloy.

Both volumes 116, 118 are generally cylindrical and are dimensioned to be a close fit in the bore 100, but enough clearance must be provided to allow the volumes 116, 118 to be lowered from surface through the fluid-filled bore 100, which may not be completely straight, and which may include bore diameter restrictions. The thermite 116 and the alloy 118 may be contained within suitable carriers or canisters 117, 119. The thermite volume 116 also includes an initiator 120 which may be activated to generate a high temperature (800 to 1300° C.) to initiate reaction of the thermite. Lower thermite initiation temperatures may be associated with finer aluminium particles, however higher initiation temperatures, for example closer to 1300° C., may be desirable to minimise the risk of accidental initiation.

On activation of the initiator 120 the thermite reaction begins, with the iron oxide and the aluminium of the thermite reacting exothermically to form iron and aluminium oxide. The reaction generates high temperatures (up to 2900° C.). The thermite canister 117 may be formed of aluminium alloy, which may melt as the thermite reacts. The energy released by the reaction heats the well fluid 122 and the casing 104 surrounding the volume 116, and some of the heated fluid will move upwards to heat the alloy volume 118. However, the primary heating mechanism for the alloy 118 is via conduction; the lower end of the alloy volume 118 may be in contact with the upper end of the thermite volume 116. The alloy 118 is very quickly heated above its melting temperature (138° C.) and is thus mobilised. The alloy canister 119 may include a bailer feature such that the molten alloy may flow out of the lower end of the canister 119. The bailer may have an additional feature to delay the flow of alloy until a predetermined time or alloy temperature has been reached or a predetermined wellbore temperature has been observed; potentially during the wellbore cooling following the peak thermite reaction temperature.

The molten alloy is dense and mobile and flows into and fills the annular gap 124 between the thermite 116 and the casing 104, displacing any well fluid or other material from the gap 124. The molten alloy will displace any well fluid from between the thermite and the bridge plug 110 and will flow into any gaps or spaces between the bridge plug 110 and the casing 104.

The thermite composition selected may substantially retain its cylindrical form during and after reacting, leaving a cylinder of iron and aluminium oxide. Depending on the nature of the thermite mixture, the iron may remain substantially dispersed within the aluminium oxide, or the iron and aluminium may tend to settle into distinct layers. For example, if the initial thermite composition includes a sufficiently large proportion of a high solidification temperature material, such as aluminium oxide, this will reduce the peak reaction temperature to near the solidification temperature of the aluminium oxide reaction product. In such a composition the iron will be more likely to remain dispersed through the aluminium oxide because solidification occurs relatively rapidly and the products are thus more likely to retain the original cylindrical form. The molten alloy will flow into any perforations, voids or cracks in the reacted thermite. The thermite may be subject to a degree of shrinkage on cooling and the molten alloy will occupy and seal any associated gaps or spaces. The volume of alloy provided is sufficient to fill all the gaps and voids in and around the thermite and leave enough alloy remaining to provide a solid barrier layer of alloy 126 above the thermite 116 adequate to withstand the anticipated pressure differential.

The alloy will solidify as the thermite reaction products cool and as heat is lost to the surrounding well structure and well fluid. The reacted thermite will cool to leave a physically robust cylinder which provides a platform for the reformed alloy, which fuses to the surface of the thermite and the surface of the casing 104.

Any tendency of the thermite to shrink on cooling is countered by the tendency of the alloy to expand as it solidifies. The alloy and ceramic component of the thermite reaction are also corrosion resistant and not prone to cracking.

Figure 3:
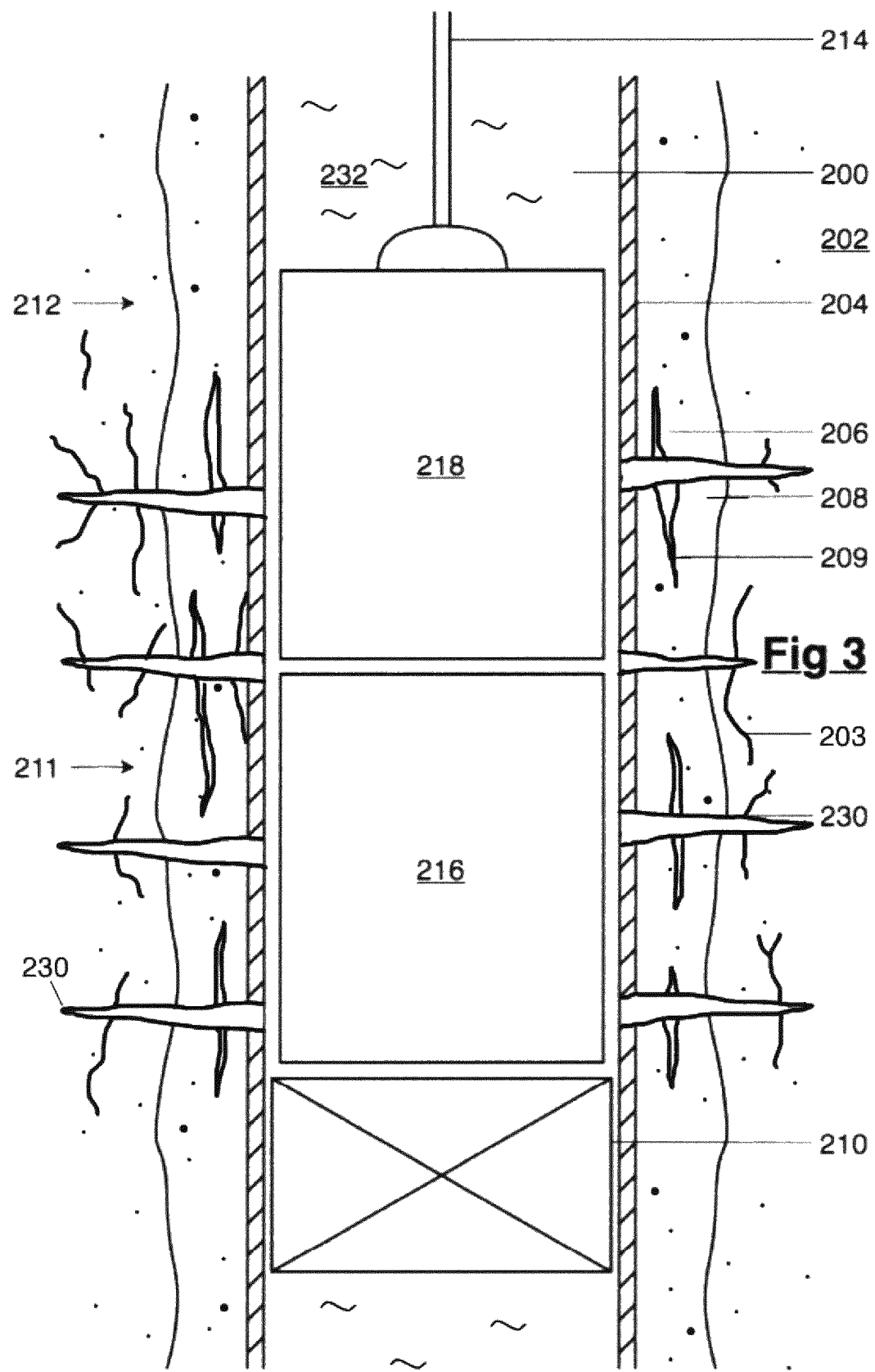
FIGS. 3 and 4 are sectional views of a well bore and show steps in a bore-sealing method according to a second example of the present disclosure.
Figure 4:
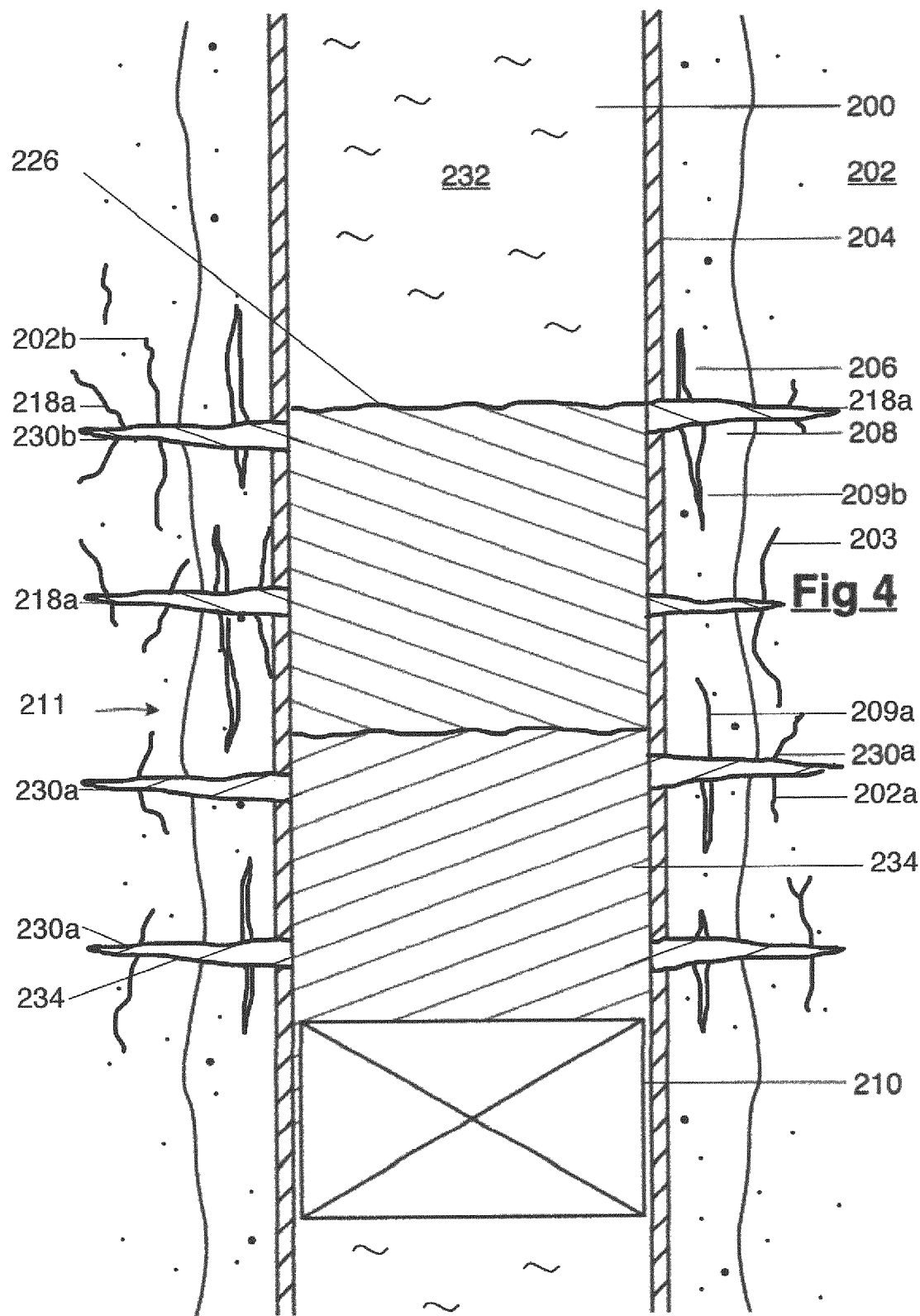

Reference is now made to FIGS. 3 and 4 of the drawings, which illustrate a section of a well bore 200 and a sealing apparatus 212 in accordance with a second example of the disclosure. As with the first described well bore 100, the well bore 200 extends through a rock formation 202 and includes a metal bore-lining casing 204. The annulus 206 between the casing 204 and the rock formation 202 is filled with cement 208.

Again, the operator has decided to permanently seal the well bore 200 and the sealing operation will be described with reference to FIGS. 3 and 4. However, in this example it has been determined that it is appropriate to provide a plug which, in addition to sealing the bore 200, also extends into the cement 208 and into the formation 202. This may be occasioned by tests indicating that the cement 208 is cracked 209 or otherwise compromised, and that the formation 202 is unconsolidated or includes fissures or cracks 203 which would provide leak paths.

A permanent bridge plug or anchored platform 210 has previously been set in the bore 200 at the lower end of the intended sealing location 211. Further, a perforating operation has been carried out in the bore 200 above the plug 210 such that circumferentially and axially spaced passages 230 extend from the bore 200 through the casing 204, the cement 208 and into the formation 202.

To assist with the sealing operation, a pill or slug of fluid 232 may have been pumped into the bore 200 to displace well fluid from the sealing location 211. The fluid 232 is selected to have a higher density, higher viscosity and lower heat capacity than water and has flux-like properties. The fluid may comprise glycerol, polymers, and organic acid flux compounds.

Sealing apparatus 212 in accordance with a second example of the present disclosure is then run into the bore 200 on wireline 214. As with the first example, the apparatus 212 comprises a volume of thermite 216 and a volume of barrier sealing material such as 58/42 Bismuth Tin (Bi/Sn) alloy 218.

The composition of the thermite 216 of this example differs from the thermite 116 of the first example. In this second example it is intended that, following initiation of the thermite reaction, in addition to the energy produced by the exothermic thermite reaction melting and mobilising the alloy 218, at least one of the thermite reaction products will become mobile and will flow radially outwards through the passages 230. This is optimised by providing an additive that reacts with the aluminium oxide reaction product to form a material having a significantly lower freezing or solidification temperature than aluminium oxide.

When the thermite reaction is initiated the iron oxide and aluminium react to form iron and aluminium oxide. Iron has a solidification temperature of approximately 1500° C. and aluminium oxide has a solidification temperature of 2072° C. Given that the peak reaction temperature is likely to be in the region of 2900° C., both the iron and aluminium oxide will initially be present in the molten or liquid phase. As the reaction products of a conventional thermite mix cool, the aluminium oxide will solidify first. If the reaction products are not contained and are permitted or able to flow, the aluminium oxide will solidify relatively quickly as it loses energy and on encountering other cooler materials, such as well fluid or well bore structures. The solidified aluminium oxide, a relatively hard ceramic, thus very quickly forms a solid dam or skin and restricts or prevents further outflow of following, or intermixed, still-molten material. The ability of the molten thermite reaction products of a conventional thermite mixture to flow outwards in a well bore environment is thus substantially restricted and it is most unlikely that any substantive infiltration or penetration of the molten reaction products of a conventional thermite mix into the passages 230 would be achievable.

In the second example of the present disclosure this issue is addressed by including an additive in the thermite mix which converts at least some of the aluminium oxide product to a mineral having a lower solidification temperature. In this specific example conversion of the aluminium oxide to the mineral feldspar is achieved by adding a molar mixture of calcium inosilicate (wollastonite) and silicon dioxide to the thermite reactants. At its stoichiometric formulation (approximately 44% of the total reactant mass represented by calcium inosilicate and silicon dioxide) substantially all of the aluminium oxide is converted to a pure anorthite feldspar. This mineral has a solidification temperature of approximately 1500° C. In other examples, other additives can produce similar effects on the melt/solidification temperature of the thermite reaction products.

In practice, the presence of calcium inosilicate and silicon dioxide will result in the conversion of the aluminium oxide to a mix of feldspar and some aluminosilicates. This low melt/solidification temperature product, or molten feldspar mix 234, is relatively mobile and will remain mobile for significantly longer than would pure aluminium oxide. The molten reaction products will flow or slump radially outwards to fill and close the bore 200 around the thermite. Further, the molten thermite products, notably the relatively mobile molten feldspar mix 234, may flow into and through the passages 230, and potentially into the cement and formation cracks 209, 203. The molten feldspar 234 may flow through the passages 230 without significantly degrading the surrounding material. As the molten feldspar mix 234 flows outwards from the initial thermite location the feldspar 234 will provide additional heating to the adjacent casing 204, cement 208, formation 202, fluid 232 and any remaining well fluid. Thus, the thermite reaction is effective in heating the volume around the sealing location 211.

As with the first example, the reacting thermite also heats and mobilises the alloy 218. The dense and mobile molten alloy 218a will flow over and around the thermite reaction products, filling any remaining gaps or spaces between the thermite products and the casing 204 and filling any perforations, voids or cracks in the thermite reaction products. The alloy 218 fuses with the thermite reaction products to create a secure bond between the different materials.

The molten alloy 218a will also flow into and through the passages 230 and cracks 209, 203, again without significantly degrading the surrounding materials. The combination of greater mobility, higher density and significantly lower solidification temperature facilitates flow of the molten alloy 218a further into the passages 230 and cracks 209, 203. This is further assisted by the heating of the sealing location 211 by the feldspar mix 234 which will continue to provide a heating effect, and indeed will remain above the freezing temperature of the alloy, even once the feldspar mix and the other thermite reaction products have solidified. The molten alloy 218a will permeate into and fully occlude any passages 230a and cracks 209a, 203a already partially filled by the feldspar mix 234, and will further occlude any other passages 230b and cracks 209b, 203b not penetrated by the feldspar mix 234. The molten alloy 218a will also fill any gaps resulting from the thermite reaction products shrinking on cooling.

The volume of alloy provided is selected to fill the passages 230 and leave a volume sufficient to provide a barrier layer of alloy 226 above the thermite reaction products remaining in the bore 200.

The alloy 218a will solidify and expand as heat is lost to the surrounding well structure. The thermite reaction products will also cool to leave a physically robust platform for the alloy, and to which the alloy may fuse and bond, with the thermite reaction products and the alloy extending out beyond the bore 200 to create an impermeable barrier in the area around the bore 200.

As noted above, the molten thermite reaction products and the molten alloy flow through the perforated casing 204 without degrading the casing 204. Thus, the structural integrity of the casing 204 is substantially retained and may thus contribute to the integrity of the bore seal. The operator also avoids the problems that might arise if, for example, the casing 204 was in tension, or compression, and was then melted and effectively severed by the thermite reaction products.

The penetration and bonding of the thermite reaction products and the alloy is assisted by the previous displacement of the well fluid in the sealing location 211 by the displacement fluid 232. The loss of heat energy from the thermite reaction products and the alloy to the lower heat capacity fluid 232 is less than would have been the case if the voids in the sealing location 211 had been filled with water, such that the materials will have remained molten for longer and penetrated further from the bore 200. Also, the fluid 232 may be selected to experience a less violent liquid to gas phase change and absorb less energy at the phase change than water, or may remain in the liquid phase, further reducing the loss of heat energy and minimising the physical disruption that may occur from a violent phase change. The fluid 232 also includes flux-like additives which improve the bonding between the thermite reaction products and the alloy and various well structures. The fluid 232 may also assist in carrying away impurities and may form a slag on the upper surface of the alloy.

As with the first example, any tendency of the thermite reaction products to shrink on cooling is countered by the tendency of the alloy to expand as it solidifies.

Figure 5:
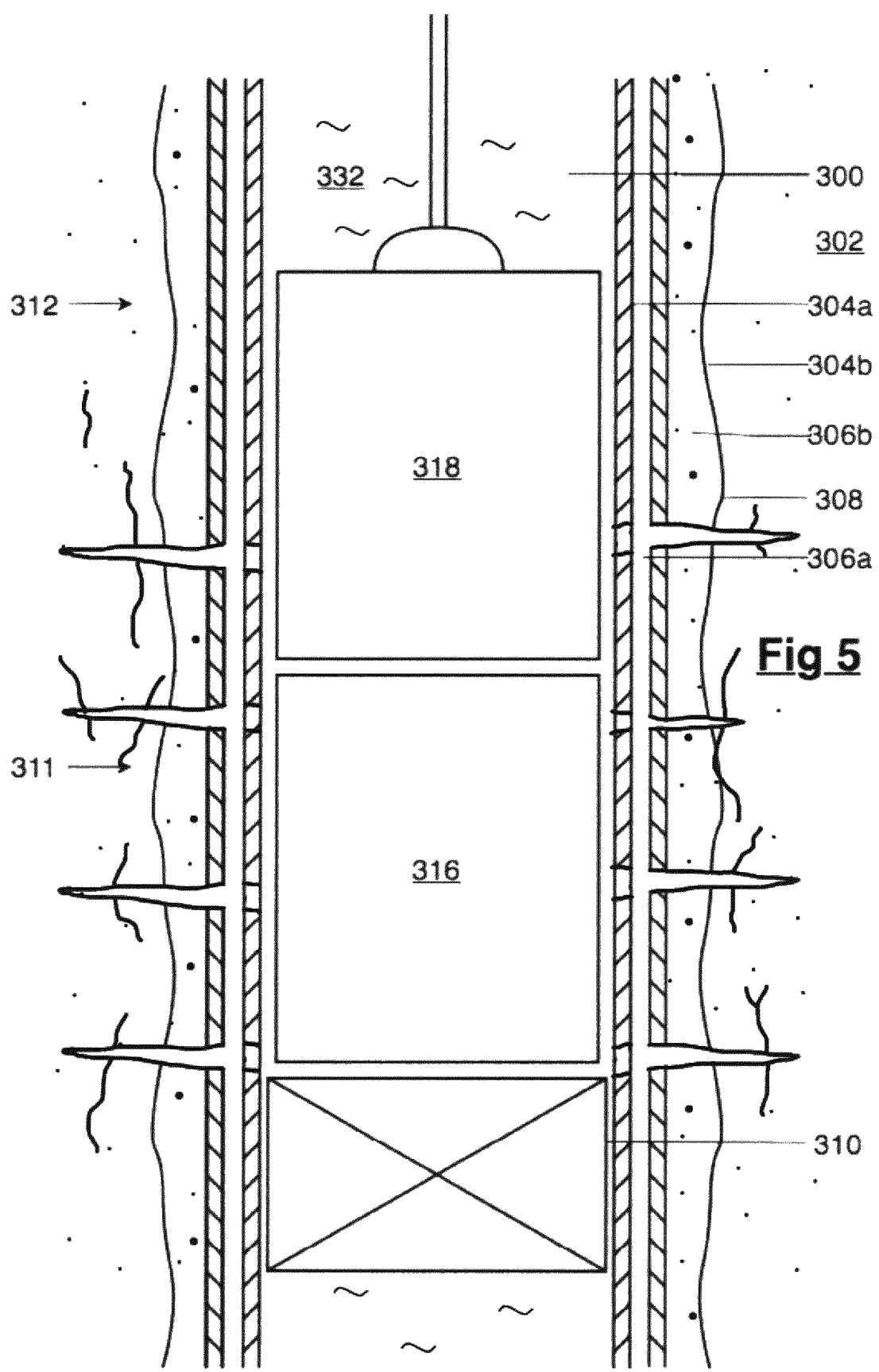
FIGS. 5 and 6 are sectional views of a well bore and show steps in a bore-sealing method according to a third example of the present disclosure.
Figure 6:
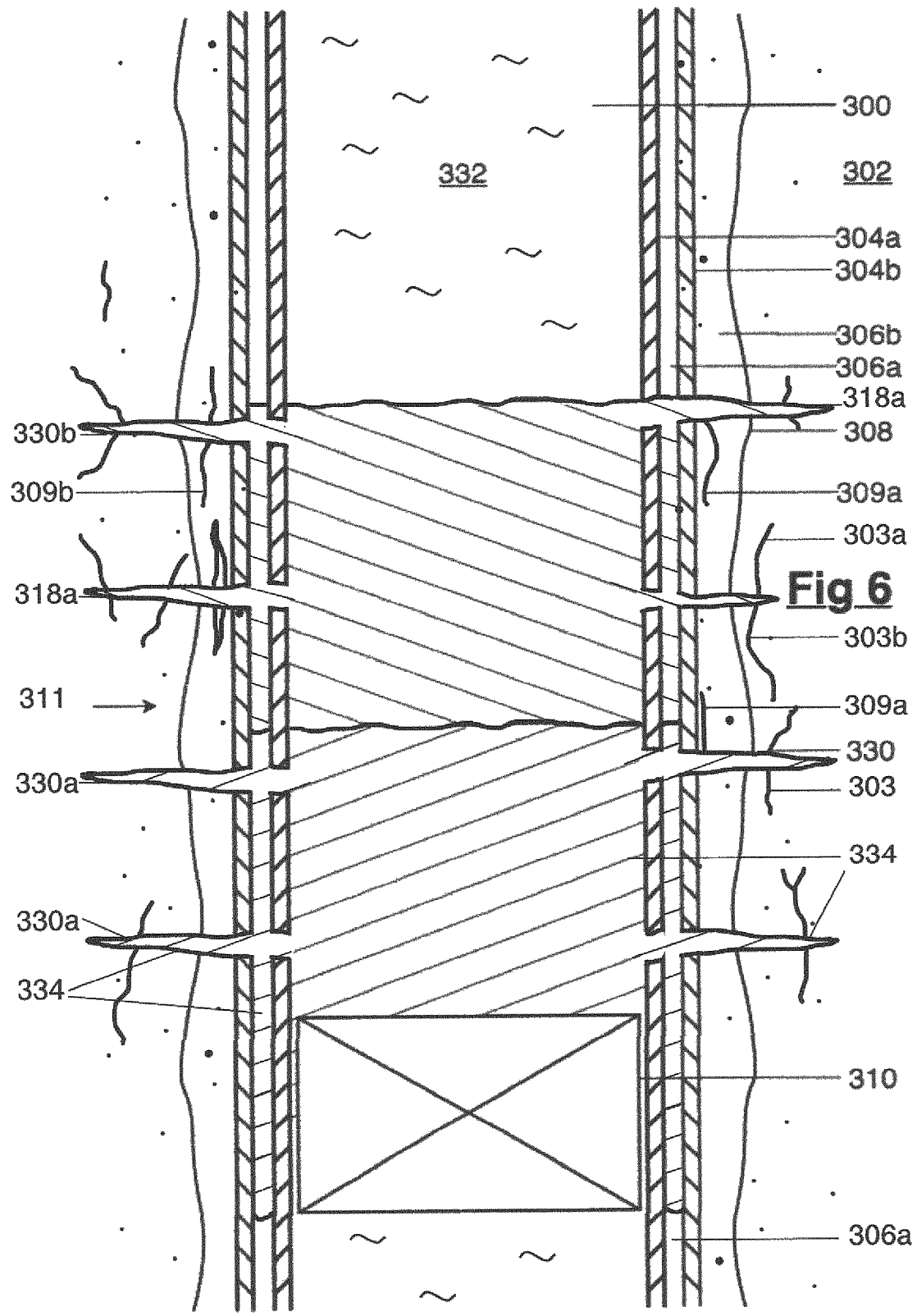

Reference is now made to FIGS. 5 and 6 of the drawings, which illustrate a section of a well bore 300 and a sealing apparatus 312 in accordance with a third example of the disclosure. As with the first and second examples, a well bore 300 extends through a rock formation 302. However, in this example the bore 300 is lined by two coaxial metal bore-lining casings 304a, 304b. The annulus 306b between the outermost casing 304b and the rock formation 302 is filled with cement 308, while the annulus 306a between the casings 304a, 304b is initially filled with well fluid.

Again, the operator has decided to permanently seal the well bore 300 and the sealing operation will be described with reference to FIGS. 5 and 6. In this example it has been determined that it is appropriate to provide a sealing plug which, in addition to sealing the bore 300, also extends into and seals the annulus 306a, and also extends into and seals the cement sheath 308 and the formation 302.

As with the other examples of the disclosure, a permanent bridge plug 310 has been set in the bore 300 at the lower end of the intended sealing location 311. Further, a perforating operation has been carried out in the bore 300 above the plug 310 such that circumferentially and axially spaced passages 330 extend from the bore 300 through the casings 304a, 304b, the cement 308 and into the formation 302.

As with the second example, a pill or slug of fluid 332 may have been pumped into the bore 300 to displace well fluid from the sealing location 311, for example from the bore 300, the annulus 306a, the passages 330. The fluid 332 may have been selected to have a higher density and/or lower heat capacity than water and has flux-like properties. In this example the fluid comprises glycerol and organic acid flux compounds. Flux compounds are also included within the volume of alloy 318.

Sealing apparatus 312 in accordance with a third example of the present disclosure is then run into the bore 300 on wireline 314. The sealing apparatus 312 is substantially the same as the apparatus 212 of the second example, and in the interest of brevity similar features of the apparatus and method may not be described in detail again.

On initiation of the thermite reaction the thermite reaction products, in this example iron and a feldspar mix, become mobile, moving radially outwards to fill the bore 300, and flowing radially outwards through the passages 330.

As in the second example, the molten feldspar 334 is relatively mobile and will flow into and through the openings 330. On flowing through the openings in the inner casing 304a, the feldspar 334 will pass into the inner annulus 306a. Gravity acting on the flowing feldspar 334 will result in the feldspar 334 initially flowing axially downwards into the annulus 306a. The feldspar 334 will be losing heat to the casings 304a, 304b and the fluid in the annulus 306a as the molten mineral passes downwards. If the flow continues for any distance the molten material will contact portions of the casings 304a, 304b and a volume of fluid which will have experienced little if any heating from the reacting thermite. Accordingly, at some point the feldspar will fall below its freezing temperature and solidify. The solid feldspar 334 will then bridge across and block the annulus 306a and prevent further downwards flow.

With the annulus 306a blocked, any further molten feldspar 334 passing from the bore 300 will continue flowing along the passages 330 and through the openings in the outer casing 304b and may even extend into any cracks or fissures in the cement and formation 309, 303. As with the second example described above, the molten feldspar 334 will heat the casings 304a, 304b, cement 308, formation 302 and the fluid 332, and any remaining well fluid. Thus, the thermite reaction is effective in heating the volume around the sealing location 311.

As with the second example, the reacting thermite also heats and mobilises the alloy 318 such that alloy flows over and around the thermite reaction products, filling any remaining gaps or spaces between the thermite products and the casing 304 and filling any perforations, voids or cracks in the thermite reaction products. The molten alloy 318a will also flow into and through the passages 330, will flow across the bridged annulus 306a, and into the cement and formation cracks and fissures 309, 303. The molten alloy 318a will permeate into and fully occlude any openings 330a and cracks 309a, 303a already partially filled by the feldspar mix 334, and will further occlude any other openings 330b and cracks 309b, 303b not already penetrated by the feldspar mix 334. The alloy 318 will fuse and bond with the feldspar mix 334 and with any other thermite reaction products.

The volume of thermite provided is selected to generate enough feldspar mix 334 to bridge the annulus 306a. As described above, the thermite reaction products may also at least partially fill the lower openings 330a and possibly some of the cracks 309a, 303a.

The skilled person will therefor understand that the sealing apparatus 312 allows an operator to seal a multi-annulus well bore without requiring existing casing to be retrieved or milled away, and to set a robust corrosion-resistant plug in the well bore.

Modifications may be made to the foregoing examples within the scope of the present disclosure. For example, the description refers primarily to thermite initially comprising iron oxide and aluminium, but it will be recognised that other combinations of materials may be reacted exothermically in a similar manner to provide appropriate heat and reaction products. It will also be recognised that in addition to or in place of the additives described herein, other additives may be included in the thermite composition to affect the behaviour and properties of the reacting thermite and the thermite reaction products, and to generate other thermite reaction products having a lower melt/solidification temperature than aluminium oxide, or any other oxide generated by the thermite reaction. As used herein, the terms "melt temperature" and "solidification temperature" refer to the temperature at which the material changes phase from a liquid to a solid. Similarly, the examples utilise a metal alloy in the form of a 58/42 Bismuth Tin (Bi/Sn) alloy. Other metals, alloys, including non-expanding alloys, alloy compositions, resins, polymers, cements and expanding cements may be used in addition to or as an alternative to the described Bi/Sn alloy composition.

The examples above include provision of a permanent bridge plug or platform which has been run into the bore prior to the sealing apparatus. In other examples a plug or platform may be run into the bore together with the sealing apparatus, or the plug or platform may be created by, for example, reacting a thermite form of an appropriate composition in the bore.

The examples above describe sealing apparatus being run into the bore on a reelable support, such as coil tubing or wireline. Alternatively, the sealing apparatus may be run into the bore on a pipe string.

In the illustrated examples the thermite and alloy are initially provided within canisters. In other examples one or both canisters may be omitted. At least one of the volumes of thermite and alloy may be self-supporting.

The third example of the disclosure describes a bore lined with two casings. In further examples the method and apparatus may be utilised in bores lined with further casings, for example three or four casings. In such examples the casings may be perforated or otherwise breached to provide communication from the bore to the rock formation to allow molten material to flow from the bore to the formation. The thermite reaction products may bridge the annuli between the casings to provide a platform for the molten alloy, facilitating flow of the molten alloy into the surrounding cement and rock formation.

In examples where two or more casings are present in the bore the operator may expand one or more of the casings, that is deform the casings to increase the diameter of the casings. The expansion may force an outer surface of an inner casing into contact with an inner surface of the adjacent casing. In other examples the expansion may merely reduce the spacing between the casings. The closer proximity of the casings facilitates heat transfer outwards from the bore by providing for direct conduction between the casings, reducing the volume of fluid between the casings, and by restricting movement of the well fluid which might otherwise result in heat being carried away from the sealing location by convection. Also, the closing of the gaps between the casings may restrict or prevent flow of molten material into the annuli below the sealing location, facilitating radial flow of molten material and facilitating formation of a thermite platform for the alloy.

The thermite provided in each of the above examples may have a consistent composition throughout the thermite volume. Alternatively, a variety of thermite compositions may be provided within a single sealing apparatus, or a plurality of thermite heaters of different composition may be run into the bore in sequence. In one example, a leading or lower volume of thermite may have a composition that tends to retain its solid shape and retain the iron dispersed within the aluminium oxide or other reaction products. Such a mix will tend to solidify relatively quickly to create a platform in the bore and act as a barrier to prevent subsequent penetration by molten iron. A trailing or upper volume of thermite may have a composition that encourages creation of mobile molten reaction products, such as feldspar, to facilitate radial flow and penetration of the thermite reaction products. This mobility may also facilitate accumulation of the denser molten iron in a lower portion of the reacting thermite. The presence of a layer of hot (1800-2000° C.) molten iron could result in damage to downhole structures, such as bridge plugs, and thus it may be preferable to react thermite having these properties above a volume of thermite designed to form a barrier to molten iron penetration, or above a previously formed thermite plug.

Examples of using thermite reaction charges including layers with different thermite compositions are described in U.S. Pat. No. 9,494,011, the disclosure of which is incorporated herein in its entirety.

In the examples described above a material is circulated into the bore to displace well fluids. The material may be a liquid which is circulated into the bore before placing the sealing apparatus in the bore. In other examples the material is delivered into the bore with the sealing apparatus, and may be delivered in any appropriate form, for example as a solid. The material described in the examples combines a liquid having a lower specific heat capacity than water, and a flux. In other examples these elements could be provided separately, for example by circulating a liquid with a lower specific heat capacity and by providing the flux within or in combination with the volume of alloy. The provision of flux downhole may have utility in other downhole bonding operations.

The disclosure refers primarily to oil and gas wells. The skilled person will recognise that the apparatus and methods disclosed herein are equally applicable to other industries and applications in which it is desired to seal bores or tubes.

The invention claimed is:

1. A method of sealing a subsurface bore, the method comprising:
    locating a volume of thermite in the bore at a first location;
    locating a volume of alloy in the bore at a second location;
    initiating reaction of the volume of thermite to generate heat and form thermite reaction products at the first location whereby heat energy is transferred from the reacting thermite to the second location to heat the volume of alloy; and
    bringing the volume of alloy to above the melting point of the alloy whereby the alloy becomes mobile and flows from the second location towards the first location, and the thermite reaction products and the alloy combine and then cool and solidify to provide a bore-sealing plug including a barrier layer of solidified alloy above the solidified thermite reaction products.

2. The method of claim 1, wherein the thermite reacts to form a platform that at least partially occludes the bore.

3. The method of claim 1, wherein at least one thermite reaction product and the alloy flow into a volume surrounding the bore, a thermite reaction product solidifying in the volume to create a contiguous platform around the bore, and the alloy being contained above or infused with the platform.

4. The method of claim 3, wherein the volume surrounding the bore comprises an annulus.

5. The method of claim 1, wherein the alloy fuses with the thermite to form a fluid seal.

6. The method of claim 1, comprising flowing at least one of fluidised thermite reaction products and alloy through perforations in a wall of the bore.

7. The method of claim 1, comprising:
    providing an additive in the volume of thermite; and
    initiating reaction of the thermite whereby a metal and a metallic or non-metallic oxide of the thermite react exothermically to form a metal oxide and a corresponding metal or non-metal of the reactant oxide, and whereby the metal oxide reacts with the additive to form a low solidification temperature reaction product having a solidification temperature lower than the solidification temperature of the metal oxide.

8. The method of claim 1, comprising providing an additive in the volume of thermite to lower a peak reaction temperature of the thermite.

9. The method of claim 1, comprising providing a flux compound to enhance bonding between the alloy and a bore-lining tubing.

10. The method of claim 1, wherein the volume of alloy is run into the bore together with the volume of thermite.

11. The method of claim 1, wherein a portion of the volume of thermite has an initial form and retains the initial form following reaction.

12. The method of claim 1, wherein a portion of the volume of thermite has a first form and is at least partially fluidised and assumes a second form following reaction.

13. The method of claim 1, wherein the alloy flows over a surface of the thermite.

14. The method of claim 1, wherein the alloy flows radially beyond the thermite.

15. The method of claim 1, wherein the alloy is arranged to remain in contact with a heat source until the alloy exits an alloy reservoir.

16. The method of claim 1, wherein the volume of alloy is contained until the temperature of the alloy has reached a predetermined, elevated level at which point the alloy is permitted to flow.

17. The method of claim 1, comprising forming perforations, or the like, in a wall of the bore.

18. The method of claim 17, comprising forming perforations in the bore wall which extend at least partially through at least one of a bore-lining tubing, a cement sheath, and a surrounding rock.

19. The method of claim 17, comprising flowing at least one of fluidised thermite reaction products and alloy through the perforations without significantly degrading the perforated material.

20. The method of claim 1, wherein at least one of fluidised thermite reaction products and alloy flows into at least one of rock fissures, cement fissures, annuli between bore-lining tubing sections, gaps or annuli between bore-lining tubing sections, and cement sheaths.

21. The method of claim 1, wherein the volume of alloy is initially located above the volume of thermite.

22. The method of claim 1, comprising providing at least one support in the bore below the volume of thermite.

23. The method of claim 1 comprising displacing well fluid from a selected portion of the bore with a material having at least one of a higher boiling point, a higher viscosity, and a lower heat capacity than water prior to initiating reaction of the thermite.

24. Downhole apparatus comprising:
a volume of thermite at a first location;
a volume of alloy at a second location; and
a thermite reaction initiator,
whereby initiating reaction of the volume of thermite generates heat and forms thermite reaction products at the first location whereby heat energy is transferred from the reacting thermite to the second location and heats the alloy to above the melting point of the alloy whereby the alloy becomes mobile and flows from the second location towards the first location and combines with the thermite reaction products, whereby on cooling the alloy and the thermite reaction products form a bore-sealing plug including a barrier layer of solidified alloy above the solidified thermite reaction products.

25. The apparatus of claim 24, wherein the volume of thermite includes a thermite composition comprising: a metal and a metallic or non-metallic oxide which will react exothermically to form a metal oxide and the corresponding metal or non-metal of the reactant oxide, and an additive, whereby the metal oxide reacts with the additive to form a low solidification temperature reaction product having a solidification temperature lower than the solidification temperature of the metal oxide.

26. The apparatus of claim 24, comprising a flux compound to enhance bonding between the alloy bore-lining tubing.

* * * * *